United States Patent [19]

Trankle

[11] 4,211,808
[45] Jul. 8, 1980

[54] BACKING SHEET
[75] Inventor: Richard A. Trankle, Chicago, Ill.
[73] Assignee: Roberts & Porter, Inc., Chicago, Ill.
[21] Appl. No.: 850,080
[22] Filed: Nov. 10, 1977
[51] Int. Cl.$^2$ .............................................. B32B 7/00
[52] U.S. Cl. ..................... 428/131; 355/73; 428/138; 428/192; 428/193; 428/246; 428/250; 428/252; 428/304; 430/523; 430/533; 430/496
[58] Field of Search ............... 428/131, 137, 138, 246, 428/247, 250, 252, 287, 480, 492, 909, 304, 192, 193; 96/87 R; 156/277; 355/73, 79, 122

[56] References Cited

U.S. PATENT DOCUMENTS

| 3,413,180 | 11/1968 | Smith ..................................... 428/246 |
| 3,416,948 | 12/1968 | Maurer .................................. 428/246 |
| 3,829,343 | 8/1974 | Remmert ............................... 428/246 |
| 3,881,045 | 4/1975 | Strunk .................................... 428/909 |
| 3,983,287 | 9/1976 | Gossen et al. ........................ 428/909 |

*Primary Examiner*—James J. Bell
*Attorney, Agent, or Firm*—Allegretti, Newitt, Witcoff & McAndrews

[57] ABSTRACT

A backing sheet or mat for use in the exposure of photosensitive materials under vacuum conditions, includes a sheet of porous, woven fabric having a nonreflective surface, a sheet of flexible, but substantially rigid, polymeric material beneath the fabric sheet, and a sheet of flexible rubber material beneath the polymeric sheet. Each of the sheets is attached together to form the backing sheet and a plurality of apertures extend through the thickness of the sheets of polymeric and rubber material and are arranged over substantially the entire area of the latter sheets.

16 Claims, 3 Drawing Figures

U.S. Patent  Jul. 8, 1980  4,211,808
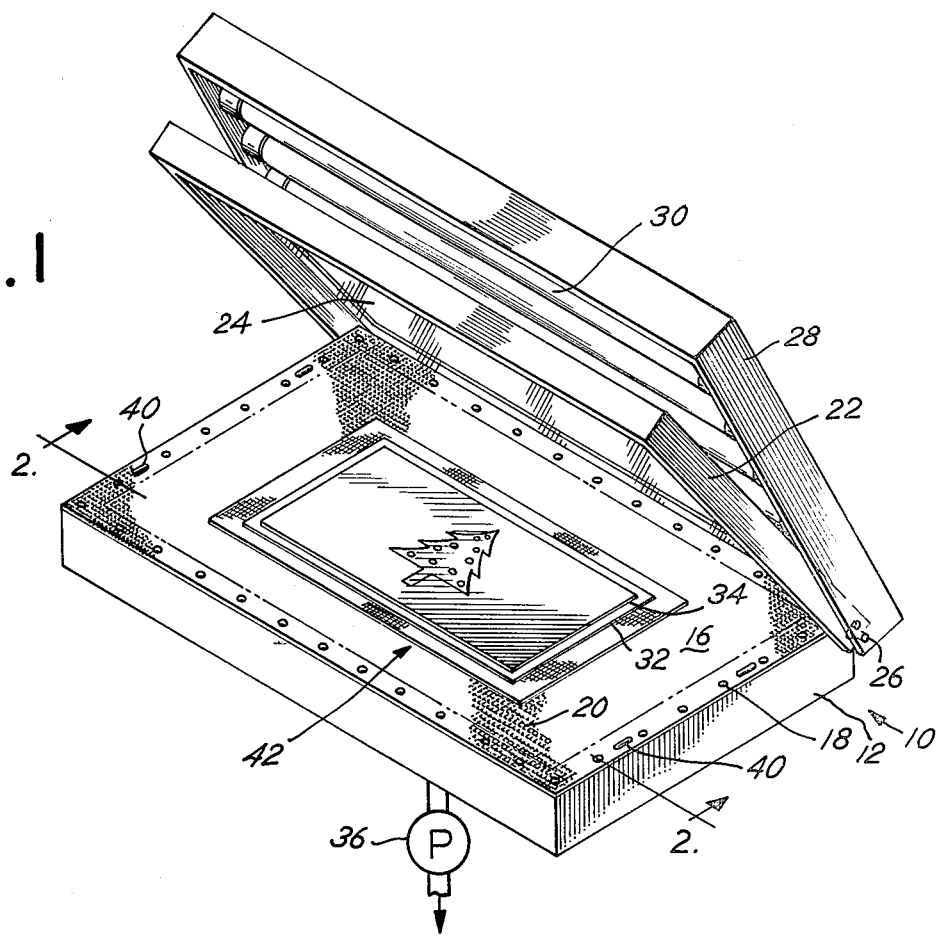
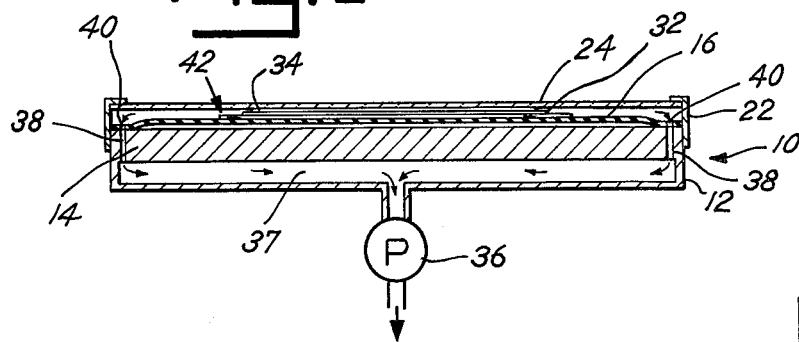
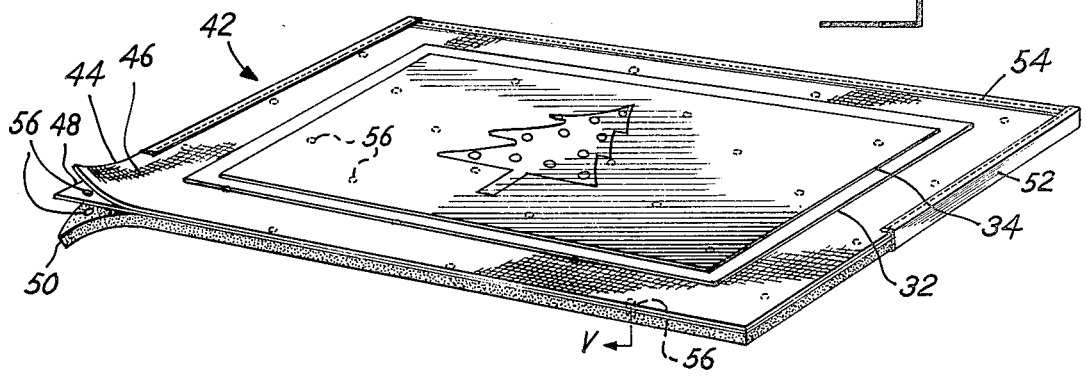

BACKING SHEET

BACKGROUND AND SUMMARY OF THE INVENTION

The present invention relates to a backing sheet or mat and, more particularly, to a flexible backing sheet or mat for use in the exposure of photosensitive materials under vacuum conditions.

Vacuum frames have been employed in the past in the exposure of photosensitive materials, for example in photolithographic, photogravure and screen printing processes. In such vacuum exposure processes, one or more mechanically or photo prepared masks or stencils having an image thereon are placed upon a sheet of photosensitive material, such as a film or plate, and both of these sheets are placed on a flexible blanket in a vacuum frame. The vacuum frame is then closed and a vacuum is drawn on the frame such that the supporting blanket is drawn upward against the mask and photosensitive sheet compressing and flattening the mask and photosensitive sheet between the glass cover of the frame and the blanket.

In order to insure that the mask and the photosensitive sheet are uniformly pressed together and against the glass and completely flattened, and to provide a satisfactory background around the perimeter of the latter mentioned sheets, various sheets of backing material have, in the past, been positioned between the blanket and the photosensitive material.

One such form of backing material has comprised a vinyl material about 30 mils in thickness. The relatively rigid nature of such backing material, however, results in several problems. One problem is the long air evacuation times necessary to completely evacuate the air between the sheets prior to exposure. If exposure takes place prior to complete air evacuation, the likelihood substantially increases that the final product will be distorted or misregistered. Air evacuation is particularly difficult with such prior backing sheets because the sheets themselves are not pervious to air and, during evacuation, the edges of the relatively flexible mask and photosensitive sheets will initially be evacuated, thus effecting a seal around the periphery of the sheets which increases the difficulty in removing the air from the center of the sheets. Where the sheets are particularly large, air evacuation may take upwards of 1¼ minutes for each set up, thus substantially lengthening the time necessary to complete a production order. Moreover, another problem with the aforementioned backing sheets is the difficulty in removing kinks, either in the mask, the film or the backing sheet itself, due to the rigidity of these backing sheets. Finally, because of the vinyl material used in these sheets, they are frequently affected by heat during exposure and become dimensionally unstable. Such instability results in a defective final product and loss of dot registration.

Another form of backing material which has been employed in the past is a polyurethane foam material which is covered on one or both sides with a sheet of frosted plastic material. Likewise, these sheets are subject to kinking of the mask or film, extended air evacuation times, and lack of mechanical stability due to the presence of the middle layer of relatively spongy polyurethane foam.

Various forms of cardboard or chipboard have also been used in the past as backing sheets, but these too suffer from air evacuation problems, dimensional instability, and also from coarseness of surface.

The backing sheet or mat constructed in accordance with the principles of the present invention overcomes these aforementioned problems. In the backing sheet or mat of the present invention, air evacuation from the center of the sheet is substantially improved in both quality and total time for evacuation, thus resulting not only in a substantial improvement in the quality of the finished product, but also in the production rate. Thereby, expensive remakes, labor and material costs and production costs are substantially reduced when using the backing sheet or mat of the present invention. The backing sheet or mat of the present invention is also higly dimensionally stable when subjected to either heat or mechanical forces, thereby substantially improving the quality of the finished product and its dot and image registration. The backing sheet of the present invention actually conforms to and smooths out surface irregularities due to varying layers of film thickness and film kinks to assure total contact and eliminate distortion in the final product, and actually enhances the smoothing and removal of kinks which may be formed in the various materials during air evacuation.

In a principal aspect of the present invention, a backing sheet for use in the exposure of photosensitive materials under vacuum conditions comprises a first layer of porous material adapted to receive the photosensitive materials thereon for exposure, a second layer of flexible, but substantially rigid, material beneath the first layer, and a third layer of a flexible material beneath the second layer, the layers being attached together to form the backing sheet.

In another principal aspect of the present invention, a plurality of apertures extend through the thickness of at least one of the second and third layers and, preferably, through both layers, and over substantially the entire area of the layers.

These and other objects, features and advantages of the present invention will be more clearly understood through a consideration of the following detailed description.

BRIEF DESCRIPTION OF THE DRAWING

In the course of this description, reference will frequently be made to the attached drawing in which:

FIG. 1 is a perspective view of a conventional vacuum frame for the exposure of photosensitive materials in which the vacuum frame is opened and a backing sheet or mat constructed in accordance with the present invention and sheets of mask and photosensitive materials are positioned thereon;

FIG. 2 is a cross-sectioned reduced elevation view of the vacuum frame as viewed substantially along line 2—2 of FIG. 1, and in which a vacuum is being drawn on the frame; and FIG. 3 is a perspective, partially broken, enlarged view of a backing sheet or mat constructed in accordance with the principles of the present invention and in which the layers of the sheet have been separated at one corner for clarity with sheets of mask and photosensitive materials positioned thereon for exposure.

DESCRIPTION OF THE PREFERRED EMBODIMENT

Referring particularly to FIGS. 1 and 2, a conventional vacuum frame is shown for use in the exposure of photosensitive materials under vacuum conditions. The vacuum frame 10 comprises a bottom generally rectangular shaped box member 12 having a plate 14 across its top. A suitable rubber or other flexible blanket 16 is held at the edges of plate 14 by suitable means, such as pins 18. The upper surface of blanket 16 is preferably slightly waffled with minute waffling at 20 to assist in air evacuation at the surface of the blanket.

The vacuum frame 10 also includes a rigid rectangular frame member 22 which holds a sheet of glass 24. The frame member 22 is hinged at 26 to the bottom box 12 at its rear so that the frame member and its glass 24 may be moved into overlying relationship to the blanket 16 and sealing relationship to the bottom box 12 as shown in FIG. 2 from the open position shown in FIG. 1.

A cover 28, containing illumination bulbs 30 is also hinged to the bottom box 12 at hinge 26 for movement into covering relationship to the frame 22 and glass 24 for exposure of the photosensitive material.

In use, a sheet of photosensitive material 32 is placed upon the blanket 16 and is covered with a mask or stencil sheet 34 having the master image thereon. The photosensitive material 32 may take the form of either a film or plate and the mask sheet 34 may have either a mechanically prepared image thereon, such as by painting on or cutout, or may be photo prepared, such as either a negative or positive image.

Once the photosensitive sheet 32 and mask sheet 34 are positioned on the blanket 16, the rigid frame 22 with its glass 24 are moved into closing relationship with the bottom box 12 and a vacuum pump 36 is energized to evacuate the space 37 beneath plate 14 as viewed in FIG. 2. A plurality of apertures 38 extend through the edge of plate 14 and apertures 40 through and around the perimeter of blanket 16, which latter apertures 40 are in registry with apertures 38. Thus, when vacuum pump 36 is energized, a vacuum is also drawn on the space between the top surface of blanket 16 and the undersurface of glass 24 to cause the blanket 16 to balloon upward due to the preexisting atmospheric pressure between its undersurface and the top surface of plate 14. When the blanket 16 balloons upward, it presses the photosensitive sheet 32 and mask sheet 34 upward and flat against the undersurface of the glass 24, as viewed in FIG. 2. Once evacuation has been completed and all the air has been evacuated from between blanket 16 and sheet 32, sheets 32 and 34, and between sheet 34 and the underside of glass 24, the sheets are exposed with light from illumination bulbs 30.

The vacuum frame and manner of exposure of the photosensitive materials under vacuum conditions thus far described are conventional. The difficulties encountered in such conventional vacuum frame process are severalfold. One difficulty is in the length of time necessary to completely evacuate all the air in preparation for exposure. Even though blanket 16 is preferably waffled at 20 to assist in withdrawal of the air from between the upper surface of blanket 16 and the underside of sheet 32, such waffling still does not fully alleviate the problem encountered in evacuating the central area of the sheets. In fact, evacuation of these areas of the sheets is actually hindered due to the fact that the peripheries of the sheets 32 and 34 are the first areas to be evacuated and, thus, they actually form a seal which hinders further evacuation of the central areas of the sheets. Moreover, the presence of the waffling 20 itself forms irregularities which may produce "halos" in the final product. Moreover, due to the unequal evacuation of the various areas of the sheets, kinks may result in one or both of the sheets 32 or 34 during evacuation, or kinks already present in one or both of the sheets prior to evacuation will not be removed during evacuation. It is a principal purpose of the backing sheet or mat of the present invention to overcome these difficulties.

Referring particularly to FIG. 3, a preferred embodiment of backing sheet or mat 42 of the present invention is shown which comprises an upper layer 44 of a material which is sufficiently porous to allow for the evacuation of air through the pores of the material. Layer 44 preferably comprises a sheet of a woven fabric. A suitable fabric has been found to comprise polyesters or blends thereof, although other fabrics may be suitable. The upper surface 46 of the fabric layer 44 is preferably non-reflective and black in color. And, it may be and is preferably treated with suitable antistatic and/or hydrophobic coatings to stabilize it and resist stains and moisture pick-up. The selection of suitable antistatic and hydrophobic coatings is well within the skill of one skilled in the art. An example of a suitable hydrophobic coating is "Scotch Gard" produced by the Minnesota Manufacturing and Mining Company.

The backing sheet of the present invention also includes a middle layer 48 which is flexible, but still rigid enough to give the backing material dimensional stability. The middle layer 48 preferably comprises a sheet of polymeric material, e.g. "Mylar" produced by DuPont de Nemours or "Estar" produced by Eastman Kodak. The thickness of this sheet is preferably approximately 0.007 inch–0.010 inch, the greater thickness being preferred where the backing sheet 42 is to be of larger dimensions.

Although layer 48 is flexible enough to readily allow bending and conformation to contour irregularities, it is rigid enough to provide dimensional stability and resist dimensional change, both during the application of mechanical forces encountered during evacuation, as well as from heat encountered during exposure.

A bottom layer 50 comprises a sheet of softer, resilient material positioned beneath layer 48. Sheet 50 may be formed of a flexible rubber or other synthetic material, such as printer's mat or other material having similar characteristics, and has a thickness of approximately 0.033–0.038 inch. Layer 50 is sufficiently flexible to conform to and smooth surface irregularities due to varying layers of film thickness, film kinks, tape and masking or stripping bases, and pins or vacuum frame blanket irregularities. Thus, the presence of layer 50 insures total contact of the mask 34 with the underside of glass 24 and with the upper surface of the photosensitive material 32, and also of the photosensitive material 32 with the upper surface 46 of the backing sheet.

Each of the layers 44, 48 and 50 are preferably bonded together with a suitable bonding agent, such as a pressure sensitive adhesive to form a one-piece, multi-ply sheet. In addition, the outer periphery of the backing sheet 42 is preferably bound with a suitable tape 52 and stitches 54.

In order to insure rapid and complete evacuation, a plurality of registering apertures 56 are formed through the otherwise, essentially impervious, layers 48 and 50. These apertures may be formed in layers 48 and 50 by drilling prior to positioning of the upper layer 44 on the backing sheet. The apertures 56 are relatively small, preferably on the order of 3/32 inch in diameter, so as to be smoothly covered by layer 44 after evacuation. Thus, except for the porous upper layer 44, apertures 56 communicate directly with the underside of the photosensitive material 32 and, because layer 44 is porous, the surface area between the upper surface 46 of the backing sheet and sheet 32 is rapidly evacuated due to passage of air through the porous layer 44 and apertures 56 as shown by the arrow V in FIG. 3. It has been found when using the backing sheet of the present invention, that complete evacuation has been readily accomplished in 10-15 seconds in the case of large sheets which would otherwise require upwards of 1¼ minutes for evacuation.

It should be understood that although compositions and dimensions have been stated therein, they are given by way of example only and may vary without departing from the spirit and scope of the invention giving due consideration to the stated purpose of each element of the backing sheet of the invention.

It will also be understood that the embodiment of the present invention which has been described is merely illustrative of one of the applications of the principles of the invention. Numerous modifications may be made by those skilled in the art without departing from the true spirit and scope of the invention.

What is claimed is:

1. A backing sheet for use in the exposure of photosensitive materials under vacuum conditions comprising
   a first layer of porous material for receiving the photosensitive materials for exposure thereon,
   a second layer of flexible, but substantially rigid, material beneath said first layer and attached directly thereto, and
   a third layer of a flexible material beneath said second layer, said layers being attached together to form said backing sheet.

2. The backing sheet of claim 1 wherein said first layer is non-reflective.

3. The backing sheet of claim 1 wherein the porous material of said first layer comprises a sheet of woven fabric.

4. The backing sheet of claim 3 wherein said fabric includes a polyester.

5. The backing sheet of claim 1 wherein said first layer is coated with antistatic and hydrophobic coatings.

6. The backing sheet of claim 1 wherein said second layer comprises a sheet of polymeric material.

7. The backing sheet of claim 1 wherein said third layer comprises a rubber sheet.

8. The backing sheet of claim 1 wherein said layers are attached together by an adhesive.

9. The backing sheet of claim 1 wherein said layers are attached together by tape means around the periphery of said backing sheet.

10. The backing sheet of claim 1 including a plurality of apertures extending through the thickness of at least one of said second and third layers.

11. The backing sheet of claim 10 wherein said apertures extend through the thickness of both said second and third layers and are arranged over substantially the entire area of said layers.

12. The backing sheet of claim 1 wherein
    said first layer comprises a sheet of woven fabric having a non-reflective surface on its side opposite said second layer,
    said second layer comprises a sheet of polymeric material,
    said third layer comprises a rubber sheet, and
    a plurality of apertures extending through the thickness of said second and third layers and arranged over substantially the entire area of said layers.

13. A backing sheet for use in the exposure of photosensitive materials under vacuum conditions comprising
    a first layer of a porous material for receiving the photosensitive materials for exposure thereon, said first layer being coated with antistatic and hydrophobic coatings,
    a second layer of flexible, but substantially rigid, material beneath said first layer, and
    a third layer of a flexible material beneath said second layer, said layers being attached together to form said backing sheet.

14. A backing sheet for use in the exposure of photosensitive materials under vacuum conditions comprising
    a first layer of porous material for receiving the photosensitive materials for exposure thereon,
    a second layer of flexible, but substantially rigid, material beneath said first layer,
    a third layer of a flexible material beneath said second layer, said layers being attached together to form said backing sheet, and
    a plurality of apertures extending through the thickness of at least one of said second and third layers.

15. The backing sheet of claim 14 wherein said apertures extend through the thickness of both said second and third layers and are arranged over substantially the entire area of said layers.

16. The backing sheet of claim 14 wherein
    said first layer comprises a sheet of woven fabric having a non-reflective surface on its side opposite said second layer,
    said second layer comprises a sheet of polymeric material,
    said third layer comprises a rubber sheet, and
    a plurality of apertures extending through the thickness of said second and third layers and arranged over substantially the entire area of said layers.

* * * * *